(12) United States Patent
Koreki et al.

(10) Patent No.: US 8,407,982 B2
(45) Date of Patent: Apr. 2, 2013

(54) END BURNING TYPE GAS GENERATOR

(75) Inventors: Takemasa Koreki, Tokyo (JP); Ichiro Yamaguchi, Tokyo (JP)

(73) Assignee: IHI Aerospace Co., Ltd., Tokyo (JP)

( * ) Notice: Subject to any disclaimer, the term of this patent is extended or adjusted under 35 U.S.C. 154(b) by 1047 days.

(21) Appl. No.: 12/404,074

(22) Filed: Mar. 13, 2009

(65) Prior Publication Data

US 2009/0229245 A1    Sep. 17, 2009

(30) Foreign Application Priority Data

Mar. 13, 2008    (JP) ................................. 2008/063505

(51) Int. Cl.
    *F02K 9/00* (2006.01)
(52) U.S. Cl. ................. 60/253; 60/254; 60/219; 60/234
(58) Field of Classification Search .................... 60/253, 60/254, 234, 219
    See application file for complete search history.

(56) References Cited

U.S. PATENT DOCUMENTS

| | | | | |
|---|---|---|---|---|
| 3,226,928 A | * | 1/1966 | Jackson et al. .................. | 60/253 |
| 3,286,462 A | * | 11/1966 | Miller ........................... | 60/39.47 |
| 3,293,855 A | * | 12/1966 | Cuttill et al. .................... | 60/229 |
| 3,885,385 A | * | 5/1975 | Nicastro et al. ................. | 60/250 |

FOREIGN PATENT DOCUMENTS

JP    2002-204947    7/2002

\* cited by examiner

*Primary Examiner* — William H Rodriguez
*Assistant Examiner* — Craig Kim
(74) *Attorney, Agent, or Firm* — Griffin & Szipl, P.C.

(57) ABSTRACT

An end burning type gas generator includes a hollow cylindrical combustor, a propellant that is densely charged in the combustor concentrically and in a plurality of layers without leaving a large void in an internal cross section and that has the same sectional area in each of the layers, and an interstructure separating the plurality of layers from each other and connecting only at a turning portion at an axial end. The propellant end burns sequentially, progressing via the turning portion, beginning with an outermost layer or an innermost layer. The turning portion includes an end outer plate continuously surrounding ends of inner propellant and outer propellant, and a burning rate increasing member provided along the inner surface of the end outer plate to increase the burning rate of the propellant. The end outer plate is shaped such that the burning area at the turning portion remains substantially constant.

13 Claims, 14 Drawing Sheets

END BURNING TYPE GAS GENERATOR

This application claims priority from Japanese Patent Application No. 063505/2008, filed Mar. 13, 2008, the entire disclosure of which is incorporated herein by reference.

BACKGROUND OF THE INVENTION

1. Field of the Invention

The present invention relates to an end burning type gas generator used with, for example, a side thruster or the like of a flight, such as a solid propellant rocket motor or spacecraft.

2. Description of the Related Art

In an end burning type gas generator, a gas generator propellant is filled in, for example, a cylindrical combustor to form the gas generator propellant into a cylindrical shape. The cylindrical shaped gas generator propellant carries out end burning so as to cause the burning to progress in the axial direction, and the combustion gas produced by the combustion is introduced from the combustor into a functional section, such as a nozzle. As such an end burning type gas generator, there has been generally known a rocket motor filled with a solid propellant, which is a gas generator propellant.

However, in the aforesaid end burning type gas generator with the cylindrical gas generator propellant, the burning time is obtained by dividing the axial length of the cylindrical gas generator propellant by a burning rate, so that the axial length of the gas generator propellant increases with increasing burning time. For this reason, the shape of the gas generator propellant is automatically determined according to required burning time or the supply amount of a combustion gas, thus disadvantageously limiting design flexibility. Further, under a design condition that, for example, the full length of a combustor may not be increased while the shell diameter thereof may be increased, there has been a problem in that it is difficult to prolong the burning time or enhance the mass ratio of a gas generator propellant.

To solve the aforesaid problems, the applicant of the present invention has previously invented and filed a shuttle end burning type gas generator disclosed in patent document 1.

As shown in FIG. 1, the shuttle end burning type gas generator disclosed in patent document 1 is a shuttle end burning type gas generator A1 in which a plurality of layers of a gas generator propellant 50 is charged in a combustor 54 through a restrictor 59, and the layers of the gas generator propellant 50 are continuously arranged such that the end burning sequentially progresses from one layer to another. This arrangement implements considerable extension of burning time without the need for increasing the entire length of the combustor 54, leading to considerably increased design flexibility.

[Patent Document 1]
Japanese Patent Application Laid-Open No. 2002-204947 "Shuttle End Burning Type Gas Generator"

In the shuttle end burning type gas generator described above, the combustor 54 is filled with the end burning type gas generator propellant 50, which has the side surface thereof burning-restricted by a restrictor 59 and which is annularly arranged as if the gas generator propellant 50 is folded from inside to the outside. Thus, the gas generator propellant 50 is formed in two layers in the illustrated cross-section, and has an exposed end surface 51 at one end of the combustor 54 at right in the figure, while the inner layer and the outer layer continue at the other end.

However, in the gas generator disclosed in patent document 1, the turning portion burns more slowly along the outer periphery thereof than along the inner peripheral thereof, resulting in different burning areas before and after the turning portion. For this reason, eliminating the difference in burning area by means of the shape of a propellant inevitably involves a complicated shape. More specifically, the restrictor 59 of the gas generator is three-dimensionally turned from inside to outside, leading to a complicated shape of the propellant. This has been presenting a problem in that the mass ratio of a gas generator propellant is low and a complicated process is required for charging the gas generator propellant.

SUMMARY OF THE INVENTION

The present invention has been made to solve the problem described above. An object of the present invention is to provide an end burning type gas generator which makes it possible to significantly prolong burning time without increasing an entire length thereof and to generate a stable amount of a gas throughout entire burning time with a minimized fluctuation in burning area, and permits a high mass ratio of a gas generator propellant and easy charging of the gas generator propellant.

The present invention provides an end burning type gas generator including: (a) a hollow cylindrical combustor; (b) a propellant densely and concentrically charged in the combustor in a plurality of layers without leaving a large void in an internal cross section thereof, the sectional area of each layer being equal; and (c) an interstructure which separates the plurality of layers from each other and which connects only at a turning portion on an axial end; wherein the end burning of the propellant sequentially progresses from an outermost layer or an innermost layer via the turning portion.

According to a preferred embodiment of the present invention, an end of an inner propellant of the turning portion is equipped with a modified insulation having a curved surface which bulges toward or recessed from the inside of the combustor or a curved surface combining the bulging and recessed surfaces, and the modified insulation is shaped such that the burning area at the turning portion remains substantially constant.

Further, a slanting insulation whose sectional area gradually decreases as a burning length increases is provided around the outer periphery of the outer propellant at the turning portion, and the slanting insulation is shaped such that the burning area at the turning portion remains substantially constant.

The turning portion is constituted of an end outer plate continuously surrounding the ends of the inner and the outer propellants, and a burning rate increasing member for increasing the burning rate of the propellant, which is provided along the inner surface of the end outer plate, and the end outer plate is shaped such that a burning area immediately following a turn remains substantially constant.

Preferably, the burning rate increasing member is composed of a wire, foil, or mesh member made of a metal having high thermal conductivity and a high melting point.

The inner surface of the end outer plate is provided with an insulation having low thermal conductivity and high heat resistance, and the burning rate increasing member is provided directly on or slightly apart from the inner surface of the insulation, a propellant being charged therein.

Alternatively, the inner surface of the end outer plate is provided with an insulation having low thermal conductivity and high heat resistance, and a thin gas generating film made of a propellant containing a burning rate increasing member is attached to the inner surface of the insulation, a propellant being charged therein.

The burning rate increasing member may be a high burning rate propellant having a burning rate that is higher than that of the aforesaid propellant.

The combustor has a nozzle or nozzles, which exhausts or exhaust a gas generated by burning the propellant, at one axial end or both axial ends thereof, wherein the nozzle or nozzles are in communication of an end surface of a propellant of an innermost layer.

Preferably, the combustor is configured such that the one axial end or both axial ends thereof are detachable so as to allow a propellant to be directly charged therein.

According to the arrangement in accordance with the present invention described above, a propellant is concentrically and densely charged in a hollow cylindrical combustor in a plurality of layers without leaving a large void in an internal section, and an interstructure separates the plurality of layers of the propellant from each other and connects only at a turning portion of an axial end. This makes it possible the propellant to sequentially carry end burning from an outermost layer or an innermost layer via the turning portion, thus allowing burning time to be significantly prolonged without increasing the entire length thereof.

The sectional area of each layer of the propellant is the same, so that a difference in the burning area between layers is minimized.

According to a preferred embodiment of the present invention, an end of an inner propellant of the turning portion is equipped with a modified insulation having a curved surface which bulges toward or recessed from the inside the combustor or a curved surface combining the bulging or recessed surfaces. This arrangement restrains an increase in the burning area due to a part of the outer layer being added to the inner layer at the turning portion, so that the burning area at the turning portion will remain substantially constant.

The slanting insulation whose sectional area gradually decreases as a burning length increases is provided on the outer periphery of the outer propellant at the turning portion, and the slanting insulation is shaped such that the burning area immediately following the turn is substantially constant. This is effective for lowering a pressure peak immediately following the turn.

The turning portion is constituted of an end outer plate continuously surrounding the ends of the inner and the outer propellants and a burning rate increasing member for increasing the burning rate of the propellant is provided along the inner surface of the end outer plate. The end outer plate is shaped such that a burning area at the turning portion remains substantially constant, so that variations in the burning area at the turning portion are minimized, making it possible to generate a stable amount of a gas throughout burning time.

The burning rate increasing member for increasing the burning rate, which is provided around the outer periphery, makes it easily possible to attain the same burning area from the inner periphery to the outer periphery at the turning portion by means of the shape of the propellant.

Further, according to a preferred embodiment of the present invention, a propellant is concentrically charged in a plurality of layers without a void in a hollow cylindrical combustor, permitting a higher mass ratio of a gas generator propellant to be achieved.

In the case where the interstructure is made of a hard material, an insulation and a relief boot are provided on the inner surface or the outer surface of the interstructure and one axial end or both axial ends of the combustor are detachable, thus allowing the propellant to be charged therein directly and easily.

Especially in a type wherein burning sequentially progresses from an outermost layer toward an inner layer, the interstructure may be formed of only a soft material with no hard core material and a double interstructure may serve also as a relief boot. In this case also, the combustor is configured to have one axial end or both axial ends thereof detachable, allowing the propellant to be charged therein directly and easily.

DESCRIPTION OF THE PREFERRED EMBODIMENTS

Figure 1:
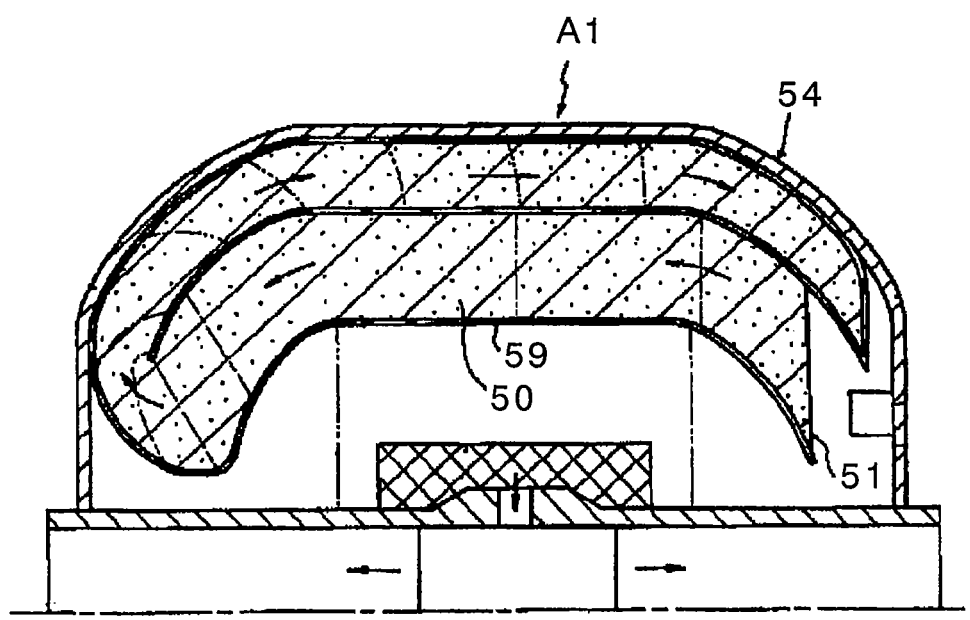
FIG. 1 is a configuration diagram of a gas generator disclosed in patent document 1.

The following will describe preferred embodiments of the present invention with reference to the accompanying drawings. In the drawings, the same reference numerals will be assigned to the same parts and the same description will not be repeated.

First, a case where a solid propellant sequentially implements end burning from an innermost layer thereof will be described.

Figure 2:
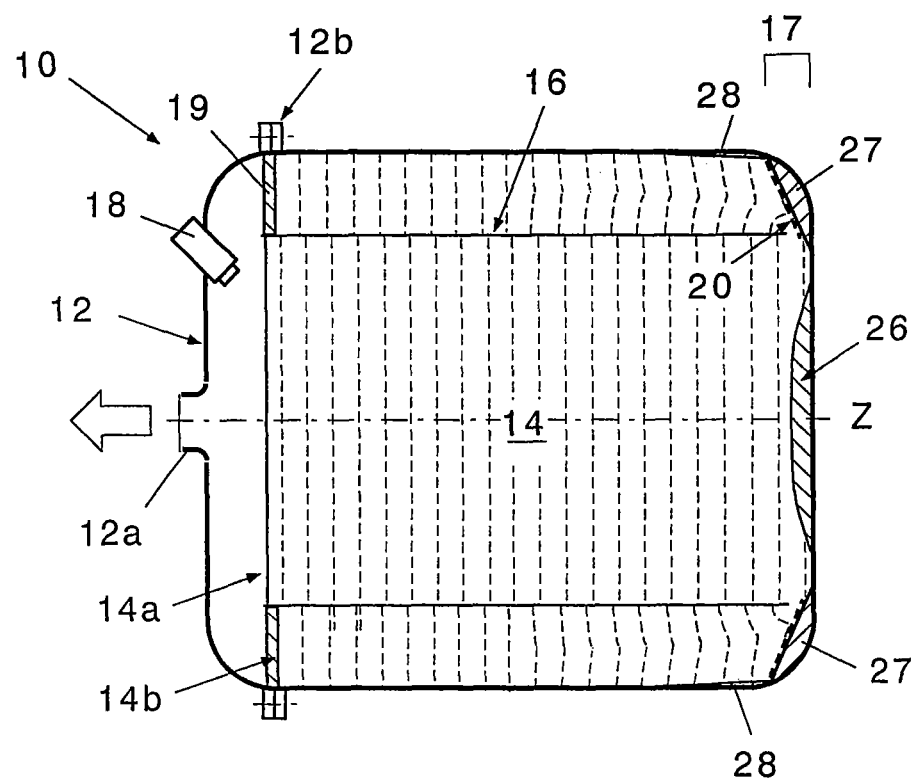
FIG. 2 is a diagram illustrating a first embodiment of an end burning type gas generator in accordance with the present invention.

FIG. 2 illustrates a first embodiment of the end burning type gas generator in accordance with the present invention.

In this figure, an end burning type gas generator 10 in accordance with the present invention includes a combustor 12, a solid propellant 14, an interstructure 16, and an igniter 18. In this example, the solid propellant 14 has a double layer composed of an inner layer (on the inner side) and an outer layer (on the outer side), and burns from the inner layer to the outer layer in order.

The combustor 12 is a hollow cylindrical airtight container which has an insulation, such as a rubber, attached to the inner surface thereof and that is made of a metal or an FRP. Further, the combustor 12 in this example has a nozzle 12a on one axial end (the left end in the figure). The nozzle 12a exhausts a gas produced when the propellant 14 burns. The nozzle 12a may be provided on both axial ends or at a different location.

The nozzle 12a in this example is in communication with an exposed end 14a of the propellant 14 of the inner layer through the intermediary of a cavity in the combustor 12. In this case, an end 14b of the propellant 14 of the outer layer is closed by a closing plate 19 formed of an insulation, such as a rubber, or a metal or an FRP provided with an insulation on the surface thereof.

Further, the combustor 12 has a joint 12b (e.g., a flange) on one axial end of the shank thereof to make the one axial end detachable thereby to allow a propellant to be directly charged therein. Alternatively, both ends of the shank may be provided with the joint 12b.

The propellant 14 is concentrically charged in the combustor 12 in a plurality of layers (two layers in this example), and set such that the sectional area of each layer is equal.

The thin dashed lines drawn in the propellant 14 in FIG. 2 schematically illustrate a burning surface of each unit burning length (2.5 cm) of end burning.

The propellant 14 is preferably a self burning gas generator propellant when used with a spacecraft, and a solid propellant used with a rocket motor may be used, although there is no particular restriction. The igniter 18 is provided in the combustor 12, facing the exposed end 14a of the propellant 14. The exposed end 14a is ignited to begin end burning.

The interstructure 16, which is formed of, for example, a heat-resistant rubber or FRP, isolates the plurality of layers of the propellant 14 from each other. The propellant 14 connects only at a turning portion 17 on an axial end.

When ignited by the aforesaid igniter 18, the propellant 14 sequentially carries out end burning from the innermost layer to the outer layer via the turning portion 17.

Referring to FIG. 2, the end portion of the inner propellant at the turning portion 17 is provided with a modified insulation 26, which has an inwardly convex curved surface having an axis Z of the combustor as the apex thereof. The modified insulation 26 is shaped such that the burning area at the turning portion 17 remains substantially constant. More specifically, when burning proceeds from the inner layer to the outer layer, if the end of the inner propellant is flat and the modified insulation 26 is not provided, then a part of the outer layer would be added to the inner layer at the turning portion 17, resulting in an increased burning area. According to the present invention, therefore, the modified insulation 26 is provided to offset the increased area. The presence of the modified insulation 26 makes it possible to reduce the burning area at the turning portion 17 and make the burning area at the turning portion 17 substantially constant.

In FIG. 2, the outer periphery of the outer propellant at the turning portion 17 is provided with a slanting insulation 28, the sectional area of which gradually decreases as the burning length increases. The slanting insulation 28 is shaped such that the burning area immediately following the turn remains substantially constant. More specifically, to restrain variations in the burning area after the turn of a burning surface, in addition to the modified insulation 26, the slanting insulation 28 is provided to increase the thickness of the insulation along the outer periphery of the outer propellant immediately following the turning portion 17 and then to gradually reduce the thickness of the insulation as the burning length increases. This arrangement is effective for reducing a pressure peak immediately after the turn from 10% to 5% or 6%.

Referring to FIG. 2, the turning portion 17 is further provided with an end insulation 27 and a burning rate increasing member 20 (indicated by the thick dashed line). The end insulation 27 continuously surrounds the ends of the inner and the outer propellants 14. The end insulation 27 is shaped such that the burning area at the turning portion 17 remains substantially constant.

The burning rate increasing member 20 provided along the inner surface of the end insulation 27 functions to increase the burning rate of the propellant 14. In this example, the burning rate increasing member 20 is formed of a wire, foil, or mesh member made of a metal having high thermal conductivity and a high melting point. The metal may be silver, copper, tungsten or the like. A silver wire, silver foil or a silver mesh is known to have a function which increases the burning rate of the propellant 14 in contact therewith by about five times.

Figure 3:
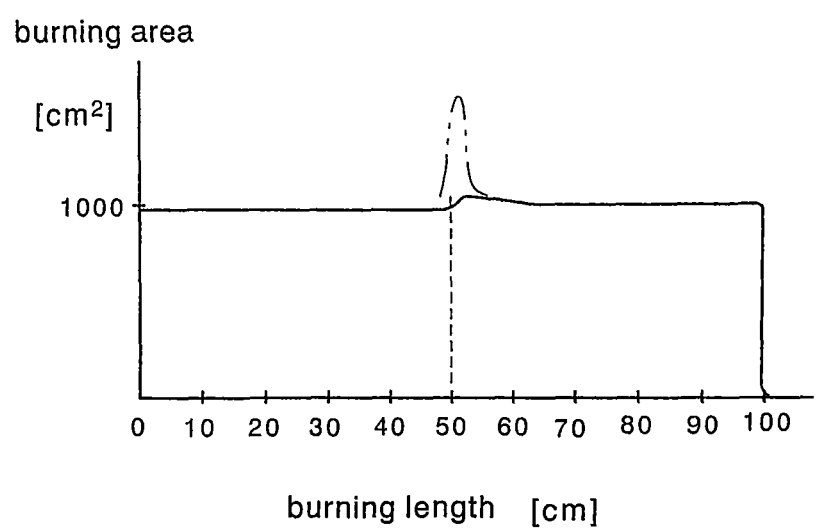
FIG. 3 is a chart illustrating a relationship between a burning length and a burning area of the embodiment illustrated in FIG. 2.

FIG. 3 illustrates the relationship between the burning length and the burning area in FIG. 2. In FIG. 3, the axis of abscissas indicates the burning length (cm) and the axis of ordinates indicates the burning area ($cm^2$). In this example, the propellant 14 is formed of a double layer of an inner layer and an outer layer, the sectional area of each layer being approximately 1000 $cm^2$. In the propellant 14, the length of the inner layer from the exposed end 14a to the entrance of the turning portion 17 is approximately 50 cm, the length of the outer layer from the end 14b to the entrance of the turning portion 17 is approximately 50 cm, and the length of the turning portion 17 is approximately 5 cm. Referring to the chart, it can be seen that the burning area varies over a range of 10% or less at the position of the turning portion 17, but the burning area remains substantially constant over the rest of the layers. The two-dot chain line in the chart denotes a case where the modified insulation 26 is absent. It can be seen that the burning area undesirably increases significantly at the turning portion, developing a resultant peak.

Figure 4:
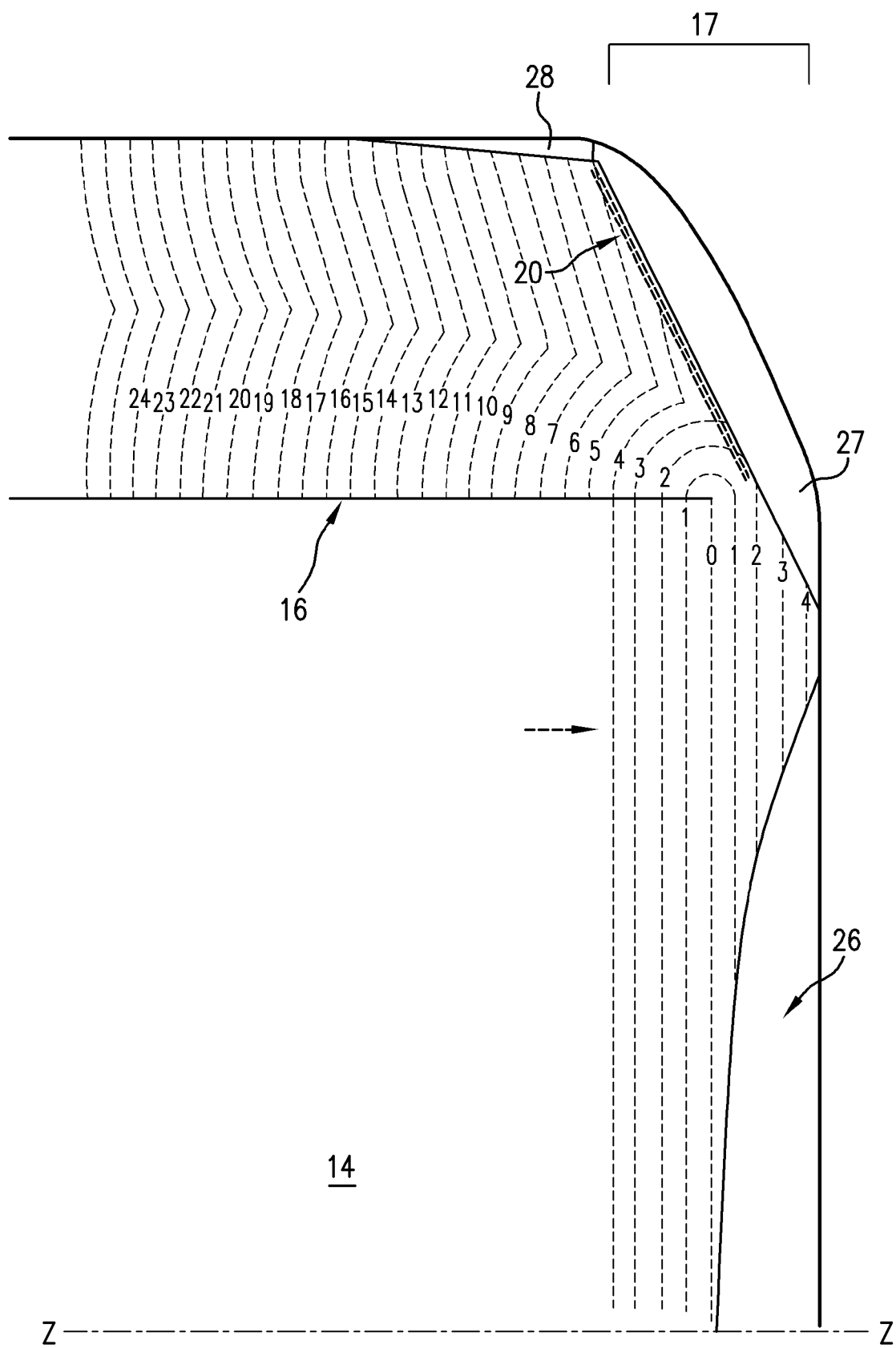
FIG. 4 is a detailed diagram of a turning portion associated with the first embodiment.
Figure 5:
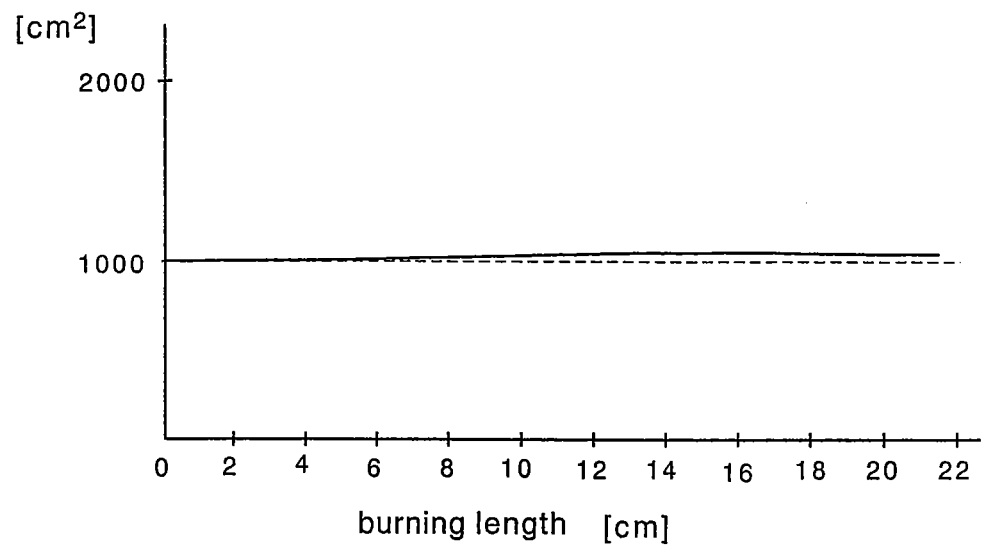
FIG. 5 is a chart illustrating changes in burning area in the turning portion in FIG. 4.

FIG. 4 and FIG. 5 are detailed diagrams of the turning portion associated with the first embodiment described above. In these figures, FIG. 4 illustrates changes in the burning surface in the turning portion 17, and FIG. 5 illustrates changes in the burning area in the turning portion 17.

The thin dashed lines in FIG. 4 schematically illustrate the burning surface for each unit burning length (0.5 cm) of end burning. The burning surfaces denoted by numerals of 0 to 24 in FIG. 4 denote the burning surfaces for each unit burning length when the right end of the interstructure 16 is used as the reference. Furthermore, the burning rate increasing member 20 is provided along the inner surface of the end insulation 27. The burning rate multiplying factor of the burning rate increasing member 20 is assumed to be five. From FIG. 5, it is seen that the burning area at the turning portion 17 in this example reaches approximately 1,060 $cm^2$ maximum.

Figure 6:
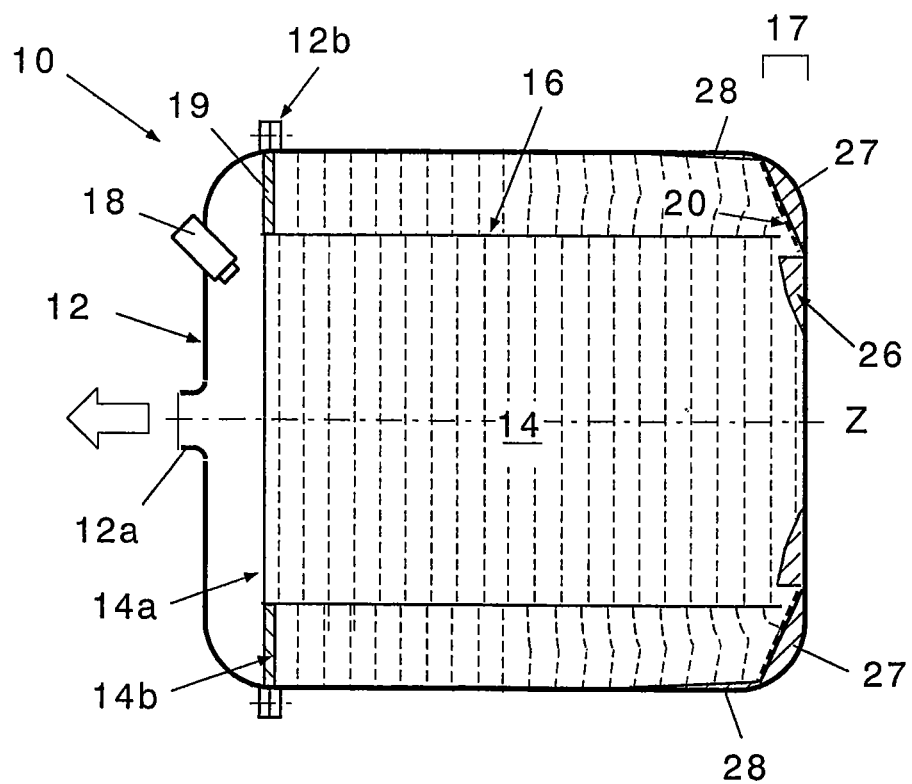
FIG. 6 is a diagram illustrating a second embodiment of the end burning type gas generator in accordance with the present invention.

FIG. 6 illustrates a second embodiment of the end burning type gas generator in accordance with the present invention. In this example, a modified insulation 26 is shaped to have a curved surface that is recessed toward the inside of the combustor. The second embodiment also allows a burning area to be the same. Furthermore, if the burning area is the same, then the modified insulation 26 may have a curved surface combining a convex and a concave.

Figure 7:
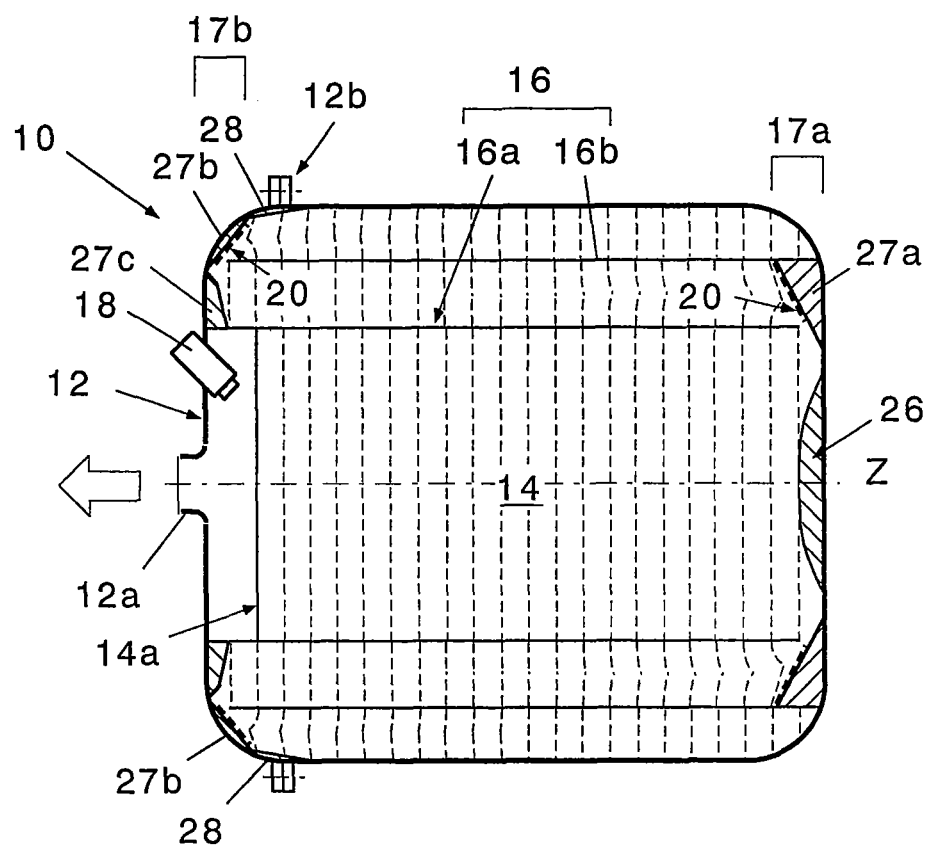
FIG. 7 is a diagram illustrating a third embodiment of the end burning type gas generator in accordance with the present invention.

FIG. 7 illustrates a third embodiment of the end burning type gas generator in accordance with the present invention. Referring to FIG. 7, an end burning type gas generator 10 in accordance with the present invention includes a combustor 12, a propellant 14, an interstructure 16, and an igniter 18. In this embodiment, the propellant 14 is formed of a triple layer having an inter layer, an intermediate layer, and an outer layer, and the burning progresses in the order of the inner layer, the intermediate layer, and the outer layer.

Referring to FIG. 7, the end portion of the inner propellant at a turning portion 17a of the inner layer and the intermediate layer is provided with a modified insulation 26 having an inwardly bulging curved surface with an axis Z of the combustor as the apex thereof. The modified insulation 26 is shaped such that the burning area at the turning portion 17a will be substantially constant. An end insulation 27a of the inner layer and the intermediate layer continuously surrounds the ends of the propellants 14 of the inner layer and the intermediate layer. The end insulation 27a is shaped such that the burning area at the turning portion 17a remains substantially constant. A burning rate increasing member 20 provided along the inner surface of the end insulation 27a functions to increase the burning rate of the propellant 14.

Referring to FIG. 7, the outer periphery of the outer propellant of the turning portion 17b of the intermediate layer and the outer layer is provided with a slanting insulation 28, the sectional area of which gradually decreases as the burning length increases. The slanting insulation 28 is shaped such that the burning area at the turning portion 17b remains substantially constant. The turning portion 17b is further provided with end insulations 27b and 27c and the burning rate increasing members 20 (indicated by the thick dashed lines). The end insulations 27b and 27c continuously surround the end of the propellant 14 of the intermediate layer and the outer layer. The end insulations 27b and 27c are shaped such that the burning area at the turning portion 17b remains substantially constant. The burning rate increasing member 20, which is provided along the inner surface of the end insulation 27b, functions to increase the burning rate of the propellant 14. The rest of the configuration is the same as that of the first embodiment.

Figure 8:
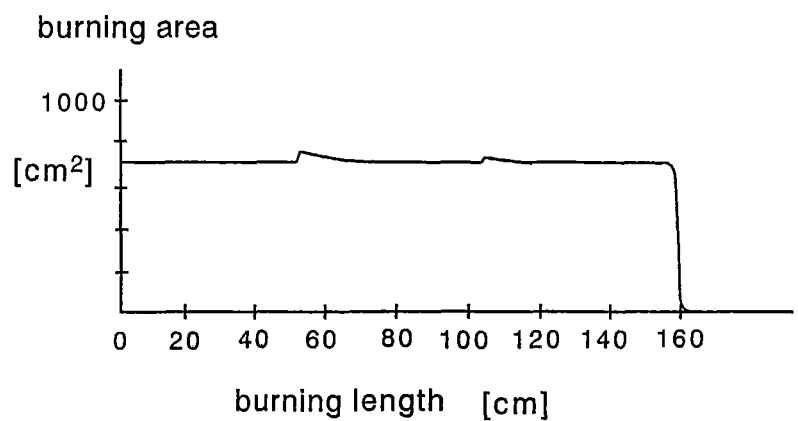
FIG. 8 is a chart illustrating changes in burning area of the embodiment illustrated in FIG. 7.
Figure 9:
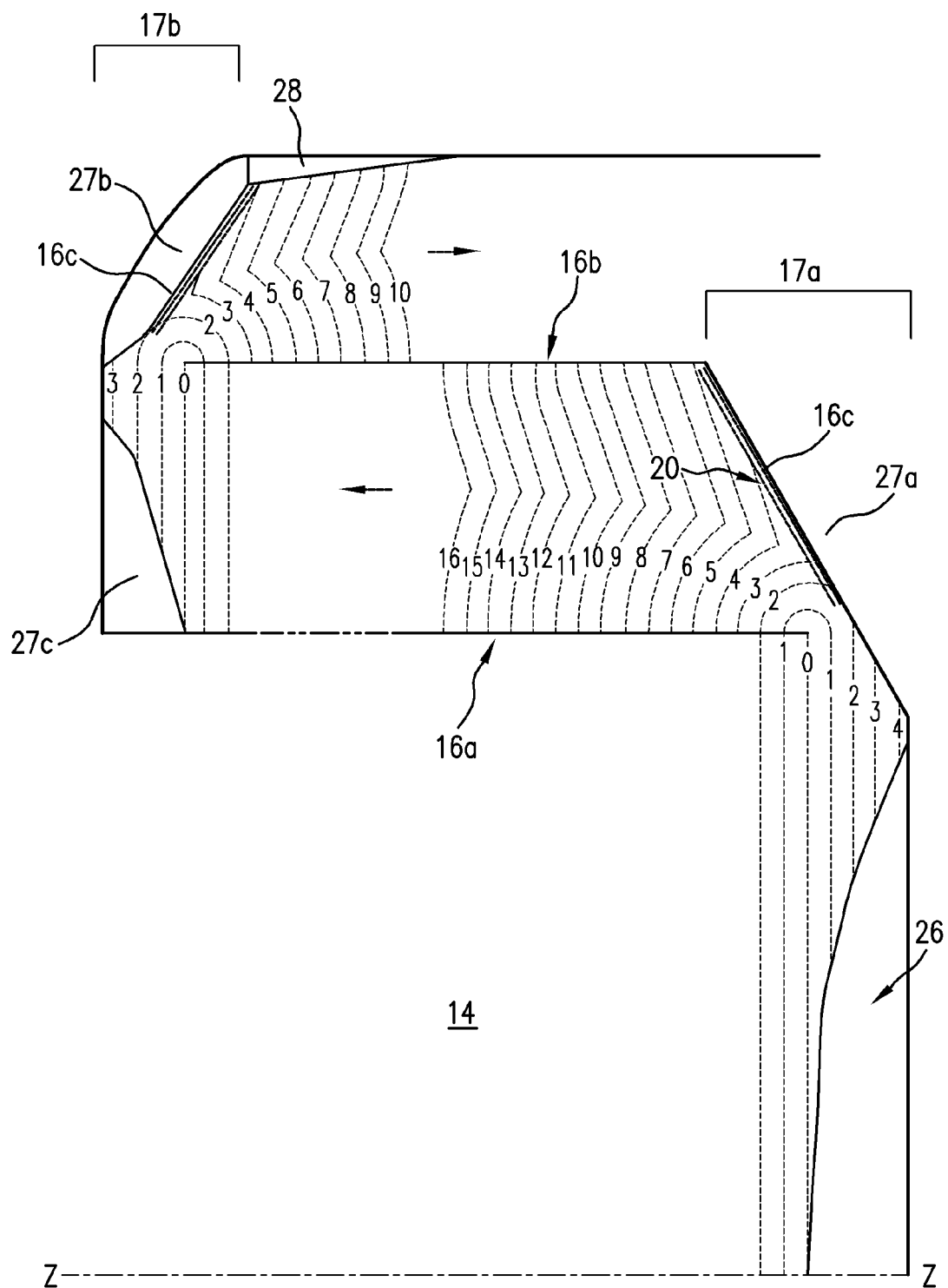
FIG. 9 is a detailed diagram of a turning portion associated with the third embodiment.

FIG. 9 is a detailed diagram of the turning portion associated with the third embodiment described above, and illustrates changes in the burning surfaces in the turning portions 17a and 17b. The thin dashed lines in FIG. 9 schematically illustrate the burning surface for each unit burning length (0.5 cm) of end burning. Each of the burning surfaces denoted by numerals of 0 to 16 or 0 to 10 in FIG. 9 denote the burning surfaces for each unit burning length when the right end of the interstructure 16a and the left end of the interstructure 16a are used as the references. Furthermore, the burning rate increasing members 20 are provided along the inner surfaces of the end insulations 27a and 27b. The burning rate multiplying factor of the burning rate increasing members 20 is assumed to be five. FIG. 8 illustrates changes in burning area in FIG. 7. From FIG. 8, it is seen that changes in the burning area at the turning portions 17a and 17b in this example remain in the range of 10% or less for approximately 660 cm$^2$ of an equilibrium portion.

FIG. 10A to FIG. 10D illustrate a specific example of the burning rate increasing member in accordance with the present invention. These figures illustrate the parallel wall surfaces of the combustor and the section of an end outer plate 16c. With reference to these figures, the following will describe a mounting means of the burning rate increasing member. The burning rate of the propellant along the burning rate increasing member (e.g., a silver wire) is increased, because the heat of a burning flame is promptly transferred to the propellant through the intermediary of a metal. For this reason, the burning rate multiplying factor is larger and stable quality is obtained in the absence of an adhesive layer between the silver wire and the propellant.

Figure 10A:
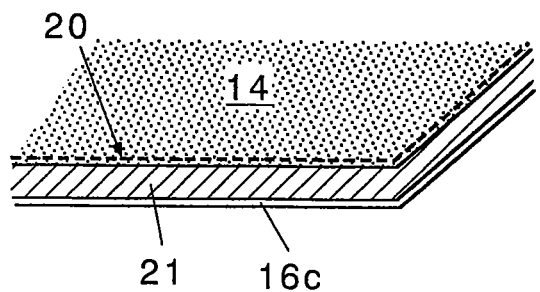
FIG. 10A to FIG. 10D are diagrams illustrating specific examples of a burning rate increasing member in the present invention.

Referring to FIG. 10A, the inner surface of the end outer plate 16c is provided with an insulation 21 which has low thermal conductivity and high heat resistance. The burning rate increasing member 20, which is made of a silver wire or mesh, is directly attached to the inner surface of the insulation 21, and the propellant 14 is charged therein. A silver film can be firmly attached to the insulation 21 with an adhesive agent, but it is difficult to firmly attach the silver film to the propellant 14 without using an adhesive agent. If a silver wire or a silver mesh is used, then the propellant 14 may be poured in so as to securely attach the insulation 21 and the propellant 14 to each other, provided that the adhesive agent on the surface of the insulation is hard and does not cover the wire or the mesh when the wire or the mesh is placed on the insulation 21. It is necessary for the silver wire or the silver mesh to be partially secured.

Figure 10B:
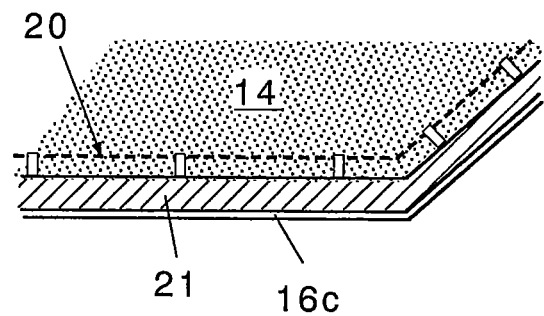

Referring to FIG. 10B, the burning rate increasing member 20, which is made of a silver wire or mesh, is provided on the inner surface of the insulation 21 with a gap between itself and the inner surface of the insulation 21, and the propellant 14 is charged therein. Thus, if the adhesive agent on the surface of the insulation is a viscous fluid, then the propellant 14 can be poured in from above the silver mesh installed with a gap between itself and the insulation 21.

Figure 10C:
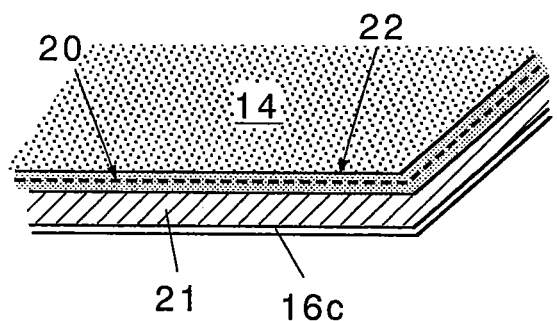

Referring to FIG. 10C, a thin gas generating film 22 composed of a propellant with the burning rate increasing member 20 is attached to the inner surface of the insulation 21, the propellant 14 being filled therein. More specifically, in this example, a thin propellant with a silver wire or a silver film is fabricated beforehand as the gas generating film 22, then the gas generating film 22 is attached to the insulation 21 of a burning rate increasing portion. Thereafter, the propellant 14 is poured therein.

Figure 10D:
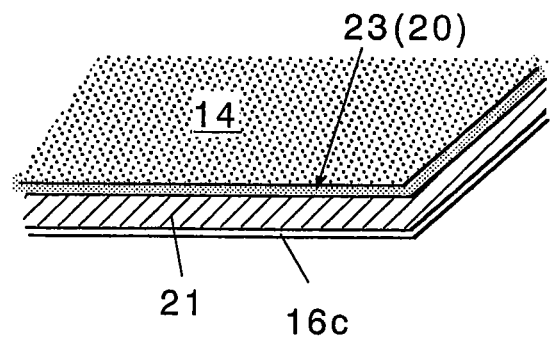

Referring to FIG. 10D, the burning rate increasing portion is a high burning rate propellant 23 which has a higher burning rate than the propellant 14. The high burning rate propellant 23 is directly attached to the inner surface of the insulation 21, and the propellant 14 is charged therein. More specifically, the high burning rate propellant 23 is attached to the insulation 21 of the burning rate increasing portion, then the propellant is poured therein. The high burning rate propellant is required merely to provide high adhesion and high burning rate, and not particularly required to exhibit propellant performance.

Figure 11A:
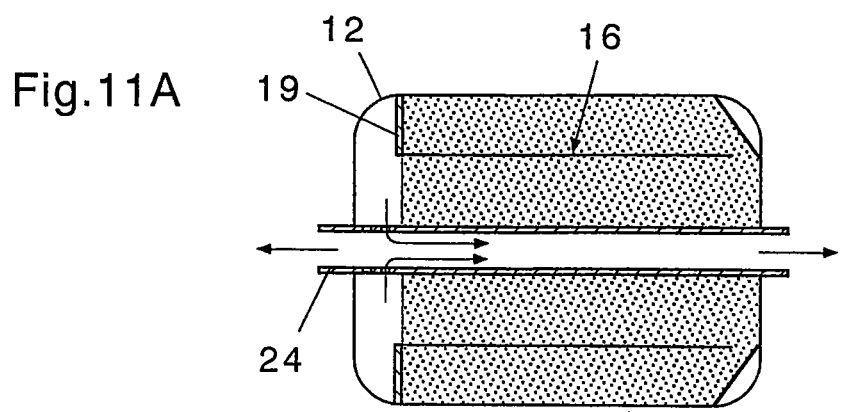
FIG. 11A to FIG. 11C are diagrams illustrating a first embodiment of a combustor in accordance with the present invention.
Figure 11B:
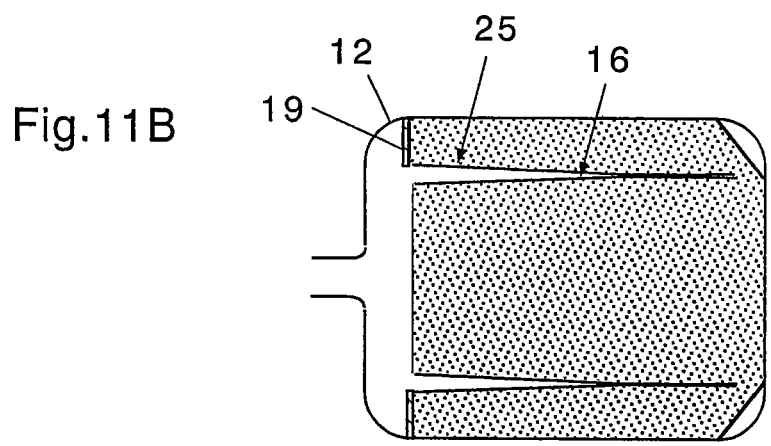
Figure 11C:
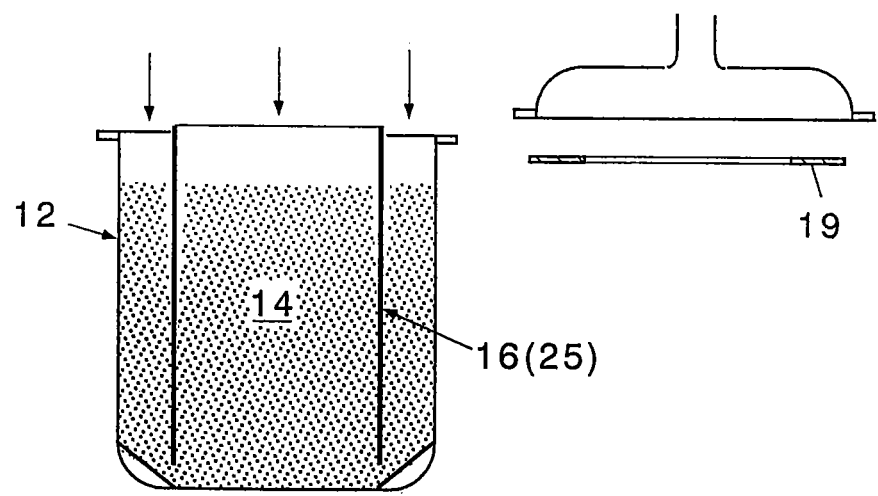

FIG. 11A to FIG. 11C illustrate a first embodiment of the combustor in accordance with the present invention. Referring to FIG. 11A, a central pipe 24 may be fixed at the center of the combustor 12 to take out a generated gas from both ends of the central pipe 24. With this arrangement, the inner propellant is supported by the central pipe 24, so that only a soft material, such as a rubber, with no hard core material, may be used for the interstructure 16.

Referring to FIG. 11B, the interstructure 16 is formed only of a soft material with no hard core material. In this case, the double interstructure 16 itself functions also as a relief boot 25. In other words, the relief boot 25 serving also as the interstructure 16 is preferably installed to restrain the propellant from cracking.

Referring to FIG. 11C, the combustor 12 is constituted such that one axial end or both axial ends thereof are detachable to allow the propellant 14 to be directly charged therein. This arrangement makes it possible to detach the axial end or ends to pour the propellant 14 in, and then a closing plate is provided on an end of the outer propellant in the final step.

The end burning type gas generator in accordance with the present invention, in which the solid propellant described above sequentially implements end burning from the innermost layer is characterized in that:

(1) the gas generator is a densely charged motor with no inner hole in the propellant 14, and the propellant 14 is concentrically disposed from the outer side to the inner side;

(2) the inner propellant is burnt first, and when the burning surface reaches an end of the motor, the burning surface is automatically turned back to burn the adjacent outer propellant;

(3) the burning rate increasing member 20 is provided on the inner surface of the insulation at an end of the outer propellant having a slant angle with respect to a motor axis at a turning portion of a burning surface;

(4) the burning rate increasing member 20 has a metal wire or mesh or film, which is made of silver, copper, tungsten or the like, attached thereto, and turns a burning surface by making use of the characteristic in which the burning rate of the propellant becomes higher than a base burning rate (about five times in the case of a silver wire) at a portion in contact with the metal wire;

(5) configuring the burning rate increasing member 20 may use a plurality of methods, including one wherein a propellant, which exhibits a high burning rate even if the performance thereof is low, is used in place of a metal wire, mesh or film;

(6) the outer propellant is secured to a motor case, obviating the need for a mechanism for supporting an interstructure. This allows the interstructure 16 to be formed only of a soft material, such as rubber, with no hard core material, thus making it possible to reduce the weight of the system;

(7) the soft interstructure 16 may be doubled to provide the relief boot 25;

(8) the central pipe 24 may be provided when it is necessary to dispose outlets of a generated gas on the right and the left;

(9) permits easy manufacture by direct casting;

(10) the end of the inner propellant of the turning portion is equipped with the modified insulation 26 having a curved surface bulging toward or recessed from the inside of the combustor or a curved surface combining the bulging and recessed curved surfaces in order to restrain fluctuation in the burning area of the turning portion 17 of the burning surface; and

(11) the insulations 27 and 28 are made thicker along the outer periphery of the outer propellant at the turning portion and then gradually made thinner as the burning length increases thereby to restrain fluctuation in the burning area following the turn of the burning surface.

As described above, according to the arrangement of the present invention, the propellant 14 is concentrically and densely charged in the hollow cylindrical combustor 12 in a plurality of layers without leaving a large void in the internal sections, and the interstructure 16 separates the plurality of layers of the propellant from each other and connects only at the turning portion 17 of the axial end. This makes it possible to sequentially burn an end of the propellant from the innermost layer via the turning portion, thus allowing burning time to be significantly prolonged without increasing the entire length thereof.

The sectional area of each layer of the propellant 14 is the same, so that fluctuation in the burning area in the layers is minimized.

According to the preferred embodiment of the present invention, the end of an inner propellant of the turning portion is equipped with the modified insulation 26 having a curved surface which bulges toward or recessed from the inside of the combustor or a curved surface combining the bulging or recessed surfaces. This arrangement restrains an increase in the burning area due to a part of the outer layer being added to the inner layer at the turning portion, so that the burning area at the turning portion will be substantially constant.

The slanting insulation 28 whose sectional area gradually decreases as the burning length increases is provided around the outer periphery of the outer propellant at the turning portion, and the slanting insulation is shaped such that the burning area immediately following the turn is substantially constant. This is effective for lowering a pressure peak immediately following the turn.

The turning portion 17 is constituted of the end outer plate 27 continuously surrounding the ends of the inner and the outer propellants and the burning rate increasing member 20, which is provided along the inner surface of the end outer plate to increase the burning rate of the propellant. The end outer plate is shaped such that the burning area at the turn remains substantially constant, so that variations in the burning area at the turning portion are minimized, making it possible to generate a stable amount of a gas throughout burning time.

The burning rate increasing member 20 for increasing the burning rate, which is provided around the outer periphery, makes it easily possible to attain the same burning area from the inner layer to the outer layer at the turning portion by means of the shape of the propellant.

Further, according to the preferred embodiment of the present invention, the propellant 14 is concentrically charged in a plurality of layers without a gap in the hollow cylindrical combustor 12, permitting a higher mass ratio of a gas generator propellant to be achieved.

The interstructure is made only of a soft material with no hard core material, the interstructure is doubled to provide the relief boot 25, and the combustor is constructed so that one or both axial ends thereof are detachable, thus allowing the propellant to be charged therein directly and easily.

A description will now be given of a case where the end burning of a solid propellant sequentially progresses from an outermost layer.

Figure 12:
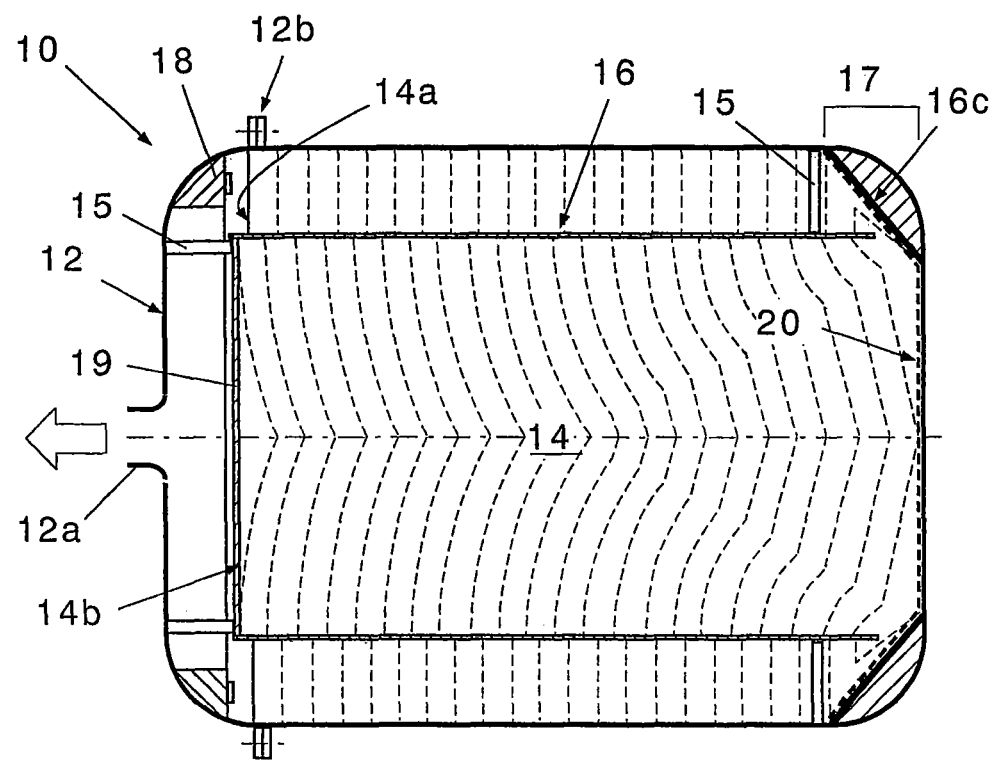
FIG. 12 is a diagram illustrating a fourth embodiment of the end burning type gas generator in accordance with the present invention.

FIG. 12 illustrates a fourth embodiment of the end burning type gas generator in accordance with the present invention. Referring to FIG. 12, an end burning type gas generator 10 in accordance with the present invention has a combustor 12, a propellant 14, an interstructure 16, and an igniter 18.

The combustor 12 is a hollow cylindrical airtight container which has an insulation, such as a rubber, attached to the inner surface thereof and which is made of a metal or an FRP. Further, the combustor 12 in this example has a nozzle 12a on one axial end (the left end in the figure). The nozzle 12a exhausts a gas produced when the propellant 14 burns. The nozzle 12a may be provided on both axial ends or at a different location. The nozzle 12a in this example is in communication with an exposed end 14a of the propellant 14 of the outermost layer through a cavity in the combustor 12. In this case, an end 14b of the propellant 14 of the innermost layer is closed by a closing plate 19 formed of an insulation, such as a rubber, or a metal or an FRP provided with an insulation on the surface thereof.

Further, the combustor 12 has a joint 12b (e.g., a flange) on one axial end of the shank thereof to make the one axial end detachable thereby to allow directly charge a propellant therein. Alternatively, both ends of the shank may be provided with the joint 12b.

The propellant 14 is concentrically charged in the combustor 12 in a plurality of layers, and set such that the sectional area of each layer is equal. In this example, the propellant 14 consists of a double layer, namely, an inner layer and an outer layer. The construction of the propellant 14 according to the present invention is not limited to a double layer, and may alternatively be a multi-layer of three layers or more. The thin dashed lines drawn in the propellant 14 in FIG. 12 schematically illustrate a burning surface of each unit burning length (2.5 cm) of end burning.

The propellant 14 is preferably a self burning gas generator propellant when used with a spacecraft, and a solid propellant used with a rocket motor may be used, although there is no particular restriction. The igniter 18 is provided in the combustor 12, facing the exposed end 14a of the propellant 14. The exposed end 14a is ignited to begin end burning.

The interstructure 16, which is formed of, for example, an FRP, isolates the plurality of layers of the propellant 14 from each other. The interstructure 16 connects only at a turning portion 17 on an axial end. In this example, the interstructure 16 and the closing plate 19 are fixed by a plurality of arms 15, with a gap provided from the inner wall of the combustor 12. A part of a metal or the FRP constituting the combustor 12 may be used as a part of the interstructure 16. This may be referred to also as the interstructure 16 in the following description.

When ignited by the aforesaid igniter 18, the end burning of the propellant 14 sequentially progresses from the outermost layer or the innermost layer via the turning portion 17.

Referring to FIG. 12, the turning portion 17 is composed of an end outer plate 16c and a burning rate increasing member 20 (indicated by the thick dashed line). The end outer plate 16c continuously surrounds the ends of the inner and the outer propellants 14. The end outer plate 16c is shaped such that the burning area at the turning portion 17 remains substantially constant. The shape of the end outer plate 16c will be described in detail in an embodiment to be discussed hereinafter.

The burning rate increasing member 20 provided along the inner surface of the end outer plate 16c functions to increase the burning rate of the propellant 14. In this example, the burning rate increasing member 20 is formed of a wire, foil, or mesh member made of a metal having high thermal conductivity and a high melting point. The metal may be silver, copper, tungsten or the like. A silver wire, silver foil or a silver mesh is known to have a function for increasing the burning rate of the propellant 14 in contact therewith by about five times.

Figure 13:
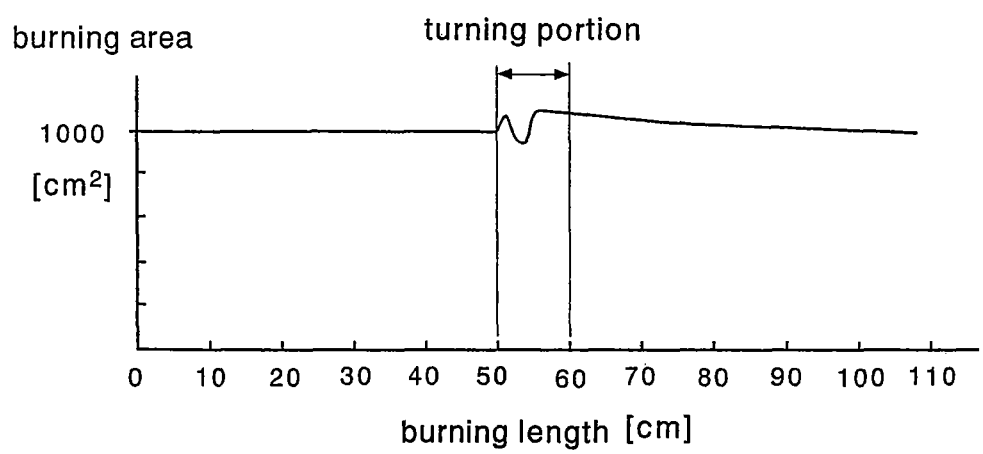
FIG. 13 is a chart illustrating a relationship between a burning length and a burning area of the embodiment illustrated in FIG. 12.

FIG. 13 illustrates the relationship between the burning length and the burning area in FIG. 12. In FIG. 13, the axis of abscissas indicates the burning length in cm, and the axis of ordinates indicates the burning area in cm². In this example, the propellant 14 is formed of a double layer, namely, an inner layer and an outer layer, the sectional area of each layer being approximately 1000 cm². In the propellant 14, the length of the outer layer from the exposed end 14a to the entrance of the turning portion 17 is approximately 50 cm, the length of the inner layer from an end 14b to the exit of the turning portion 17 is 51 cm, and the implementable length of the turning portion 17 is 8 cm. Referring to the chart, it can be seen that the burning area varies over a range of +/−10% or less at the position of the turning portion 17, but the burning area remains substantially constant before and after the turning portion 17.

Figure 14A:
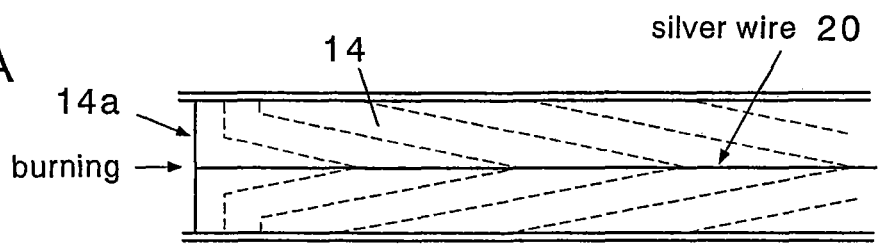
FIG. 14A to FIG. 14D are explanatory diagrams of the principle of the present invention.

FIG. 14A to FIG. 14D illustrate the principle of the present invention. FIG. 14A illustrates a case where the burning rate increasing member 20 (a silver wire in this case) is positioned at the center of the propellant 14. The thin dashed lines in the figure schematically illustrate the burning surface of each unit burning length of end burning. Since the burning rate increasing member 20 is made of a metal which has high thermal conductivity and a high melting point, a portion of the propellant 14 which comes in contact with the burning rate increasing member 20 is heated more quickly by the heat transmitted from the burning rate increasing member 20, thus making possible to increase the burning rate of the propellant 14 which comes in contact therewith. As described above, a silver wire, silver foil or a silver mesh is known to have a function which increases the burning rate of the propellant 14 in contact therewith by about five times. Hereinafter, the burning rate increase multiplying factor will be referred to as the burning rate multiplying factor. In this example, the portion in contact with the burning rate increasing member 20, which is formed of a silver wire, burns faster, so that the burning surface is formed like a chevron in the burning direction along the silver wire.

Figure 14B:
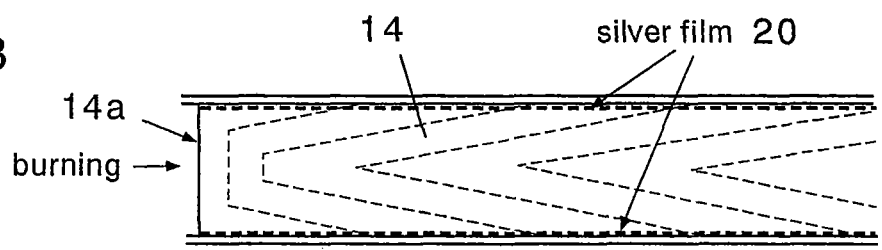

FIG. 14B illustrates a case where the burning rate increasing member 20 (a silver film in this case) is positioned on the outer surface of the propellant 14. In this example, the portion in contact with the burning rate increasing member 20, which is formed of a silver film, burns faster, so that the burning surface forms a V shape in the burning direction.

Figure 14C:
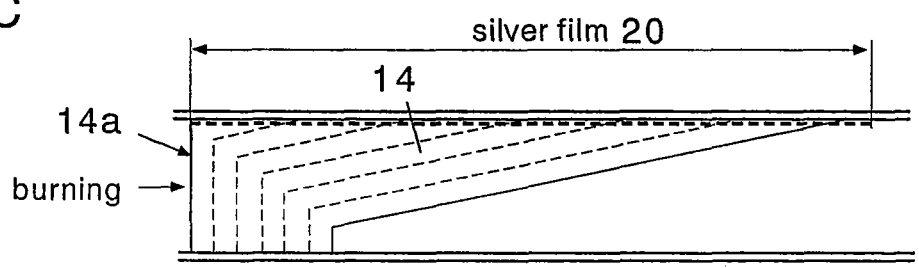
Figure 14D:
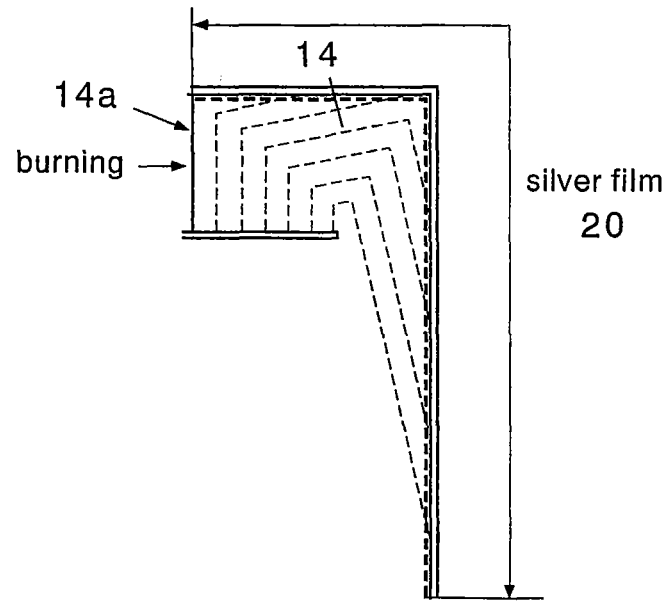

FIG. 14C illustrates a case where the burning rate increasing portion is provided only in the upper half and no burning rate increasing portion is provided in the lower half. FIG. 14D illustrates the right portion of FIG. 14C bent downward to be applied as the shape of an end of the combustor. From FIG. 14C and FIG. 14D, the changes in the burning surface in the turning portion 17 in FIG. 12 can be predicted. However, the shapes shown in FIG. 14C and FIG. 14D cause the burning area in end burning to abnormally increase at the turning portion 17, so that it is necessary to adjust the outside diameter of the propellant to restrain the abnormal increase. The shape of the end outer plate 16c for the adjustment will be described later.

Figure 15A:
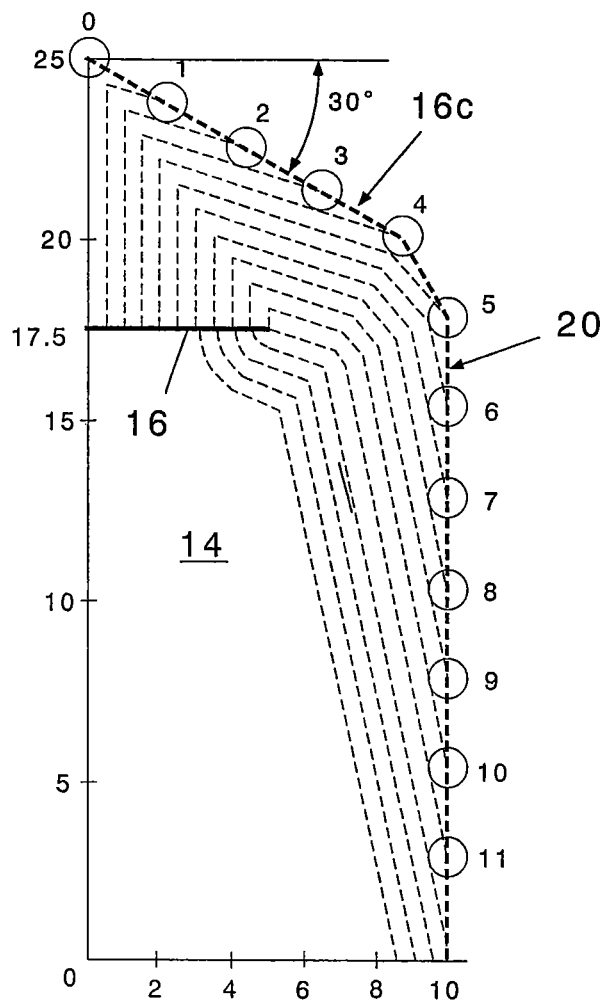
FIG. 15A and FIG. 15B are diagrams illustrating a first embodiment of the turning portion associated with the fourth embodiment.
Figure 15B:
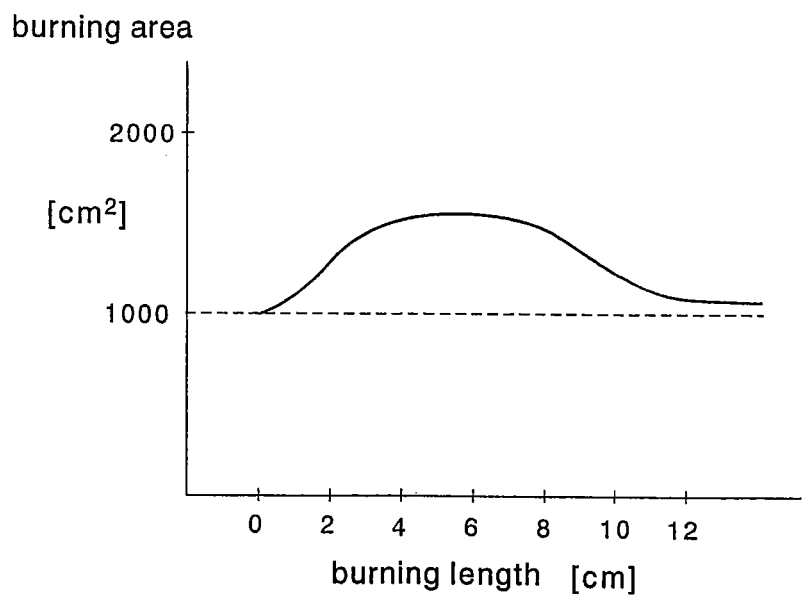

FIG. 15A and FIG. 15B illustrate a first embodiment of a turning portion associated with a fourth embodiment.

In these figures, FIG. 15A illustrates changes in the burning surface at the turning portion 17, and FIG. 15B illustrates changes in burning area at the turning portion 17.

FIG. 15A and FIG. 15B illustrate a case where the end outer plate 16c of the turning portion 17 is inclined in two steps, namely, at angles of 30 degrees and 60 degrees, with respect to the axis, and the axial length of the turning portion 17 is 10 cm. The burning rate increasing member 20 is provided along the inner surfaces of the end outer plate 16c and an interstructure 16, which continues from the inner side thereof. The burning rate multiplying factor of the burning rate increasing member 20 is assumed to be five. The thin dashed lines in FIG. 15A schematically illustrate the burning surface for each unit burning length (0.5 cm) of end burning. The circles with numerals of 0 to 11 in the chart denote the distal end of the burning surface, which is burnt at the burning rate multiplying factor 5 by the burning rate increasing member 20. From FIG. 15B, it is seen that the burning area at the turning portion 17 in this example reaches approximately 1,500 cm$^2$ maximum.

Figure 16A:
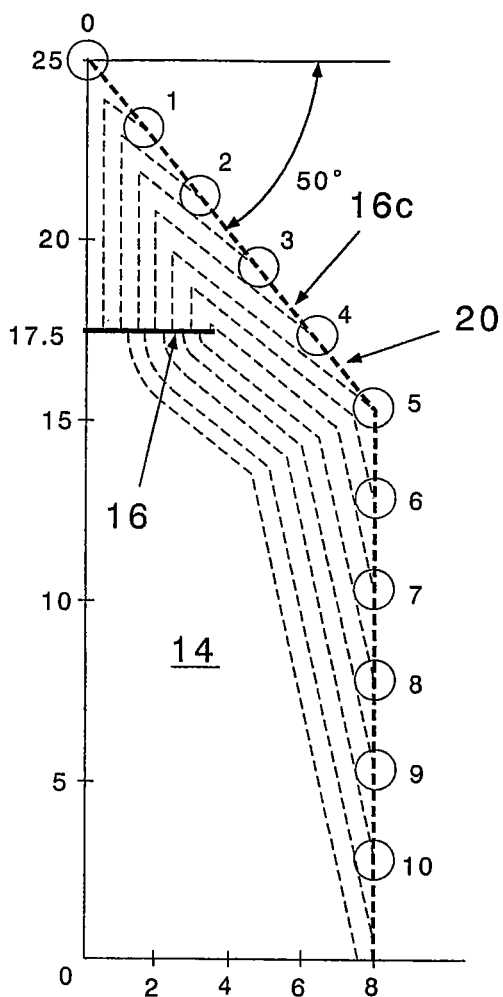
FIG. 16A and FIG. 16B are diagrams illustrating a second embodiment of the turning portion associated with the fourth embodiment.
Figure 16B:
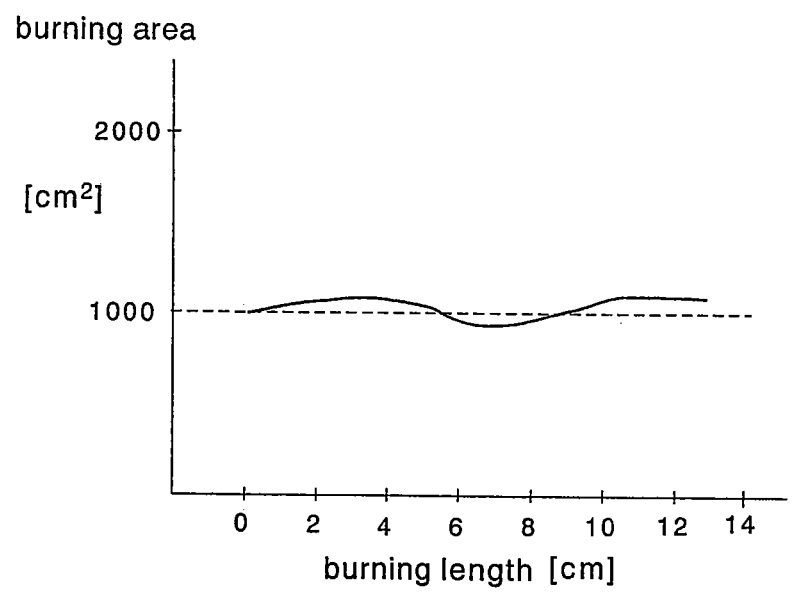

FIG. 16A and FIG. 16B illustrate a case where the end outer plate 16c of the turning portion 17 inclines at an angle of 50 degrees with respect to the axis, and the axial length of the turning portion 17 is 8 cm. The rest of the construction is the same as those shown in FIG. 15A and FIG. 15B. From FIG. 16B, it is seen that, in this example, the variations in the burning area at the turning portion 17 remain within a range of approximately 1000 cm$^2$+/−10%. The case illustrated in FIG. 12 described above corresponds to the case illustrated in FIG. 16A and FIG. 16B.

Based on the aforesaid embodiments, if the burning rate multiplying factor is 5, then the angle of the end outer plate 16c of the turning portion 17 with respect to the axis is most ideally 50 degrees, as with the case illustrated in FIG. 16A and FIG. 16B, and the axial length of the turning portion 17 is most ideally 6.4 cm to 8 cm. It is seen that, in this case, the burning area at the turning portion 17 can be set to the range of approximately 1000 cm$^2$+/−10%. The present invention is not limited to the constructions described above, and the shape of the end outer plate 16c may be determined such that the burning area at the turning portion 17 remains substantially constant.

Figure 17A:
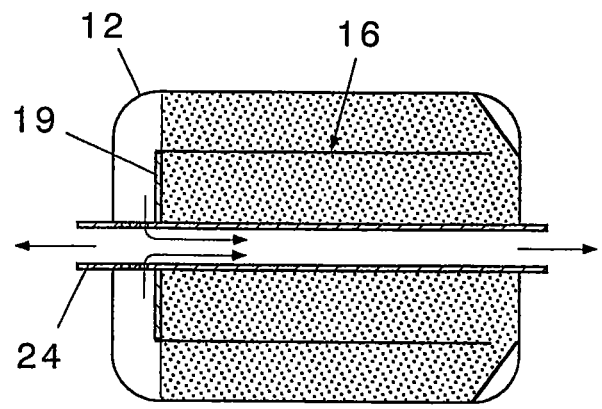
FIG. 17A to FIG. 17C are diagrams illustrating a second embodiment of the combustor in accordance with the present invention.
Figure 17B:
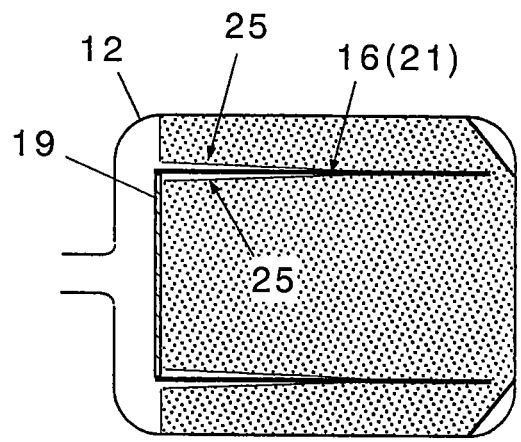
Figure 17C:
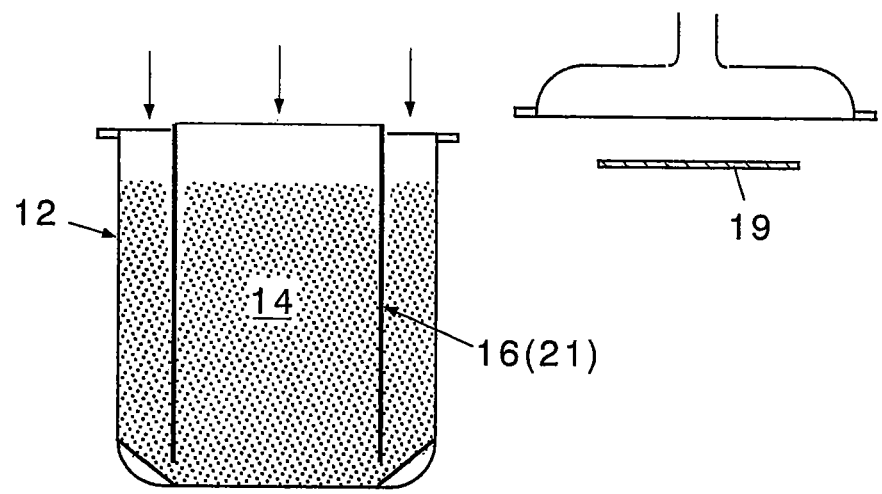

FIG. 17A to FIG. 17C illustrate a second embodiment of the combustor in accordance with the present invention. In the example shown in FIG. 12, the interstructure 16 and the closing plate 19 are fixed by a plurality of arms 15 with a gap relative to the inner wall of the combustor 12. Alternatively, as illustrated in FIG. 17A, the interstructure 16 and the closing plate 19 may be fixed to the combustor 12 by a central pipe 24, and a generated gas may be taken out from both ends of the central pipe 24. In this mode, the propellant on the inner side is supported by the central pipe 24, thus obviating the need for the arms illustrated in FIG. 12. Moreover, only a soft material, such as rubber, may be used as the material for the interstructure.

Referring to FIG. 17B, the inner surface or the outer surface of the interstructure 16 is provided with an insulation 21 which has low thermal conductivity and high heat resistance. At a place other than the turning portion, a relief boot 25, which is heat resistant and flexible, is provided on the surface of the insulation 21. More specifically, in addition to the standard mode in which the relief boot is installed to the inner side of the combustor 12, the insulation 21 and the relief boot 25 are preferably attached to the inner and outer peripheries of the interstructure 16 (e.g., a hard core material, such as a CFRP) to restrain a propellant from cracking.

Referring to FIG. 17C, the combustor 12 is constructed such that one or both axial ends thereof are detachable so as to allow the propellant 14 to be directly charged therein. This arrangement makes it possible to detach the axial end or ends to pour the propellant 14 therein, and then a closing plate is attached on an end of the outer propellant in the final step.

Figure 18A:
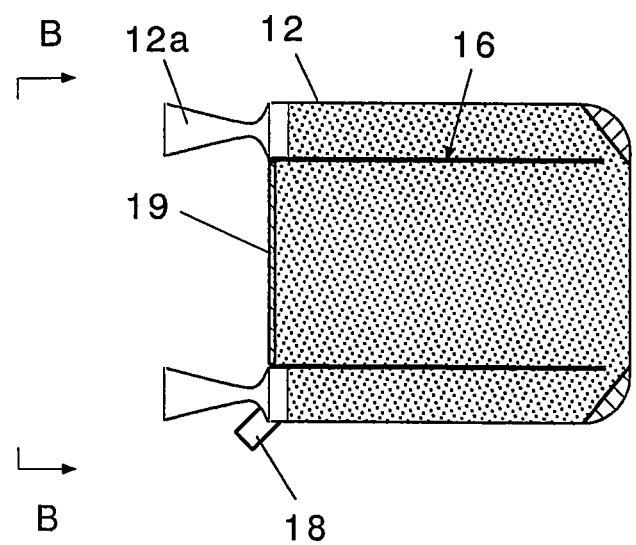
FIG. 18A and FIG. 18B illustrate an example of the method for securing an interstructure in the case where a propellant is folded from outside toward inside.
Figure 18B:
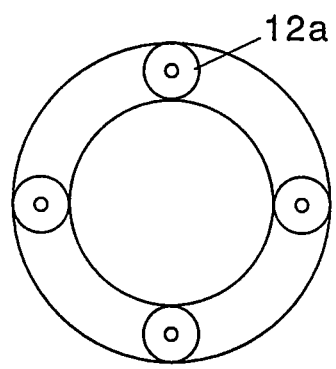

FIG. 18A and FIG. 18B illustrate an embodiment of the method for securing an interstructure in the case where the outer propellant is folded back to the inner propellant. In these figures, FIG. 18A is a longitudinal sectional diagram, as with FIG. 17A, while FIG. 18B is a fragmentary view taken at line B-B in FIG. 18A. In this example, the end surface of an inner propellant block is secured to a motor case, as illustrated. Nozzles 12a are disposed around a motor. If the motor is used as a gas generator, then only one nozzle 12a may be sufficient, but if the motor is used as a propellant device, then a plurality of nozzles (four in this example) are provided around the motor, as necessary. The rest of the construction is the same as the case where the end burning of a solid propellant sequentially progresses from an innermost layer.

The aforesaid end burning type gas generator in accordance with the present invention in which the end burning of the aforesaid solid propellant sequentially progresses from the outermost layer is characterized in that:

(1) the end burning type gas generator is a gas generator (motor) which has no internal hole in the propellant 14 and which has a high charging density, the propellant having the outer layer and the inner layer in the example illustrated in FIG. 12;

(2) the propellant of the outer layer is burnt first by the end burning method, and when the burning surface reaches an end of the outer layer, the burning surface is automatically turned back to burn the propellant of the inner layer, beginning with an end thereof in the example illustrated in FIG. 12;

(3) the outer periphery of the outer layer propellant at the turning portion 17 of the burning surface is provided with a silver film or a silver mesh, and the burning surface is turned back by making use of the characteristic in which the burning rate of the propellant becomes higher than a base burning rate (e.g., about five times) at a portion in contact with the silver film;

(4) in the example illustrated in FIG. 16, variations in the burning area at a turning point can be controlled to +/−10% or less, and the pressure (burning area) before and after the turning point remains substantially constant;

(5) a different metal, such as copper or tungsten, which has high thermal conductivity and a high melting point may be used in place of silver;

Using a metal mesh instead of a metal film provides the same advantages;

A mesh can be easily attached to the surface of a propellant or an insulation that has a curved surface;

Instead of using a metal film, a propellant, which develops a high burning rate even if the performance thereof is low, may be used in place of a metal film;

A multi-stage turn motor having a plurality of turning points is also designable; and (6) the gas generator (motor) in accordance with the present invention can be fabricated by direct casting by using the boundary of an outer layer propellant and an inner layer propellant as a relief boot.

As described above, according to the arrangement of the present invention, the propellant 14 is concentrically and densely charged in the hollow cylindrical combustor 12 in a plurality of layers without leaving a large void in the internal sections, and the interstructure 16 separates the plurality of layers of the propellant from each other and connects only at the turning portion 17 of the axial end. This makes it possible to sequentially burn an end of the propellant from the outermost layer via the turning portion, thus allowing burning time to be significantly prolonged without increasing the entire length thereof.

The sectional area of each layer of the propellant 14 is the same, so that fluctuation in the burning area in the layers is minimized.

According to the preferred embodiment of the present invention, the turning portion 17 is constituted of the end outer plate 16c continuously surrounding the ends of the inner and the outer propellants and the burning rate increasing member 20 which is provided along the inner surface of the end outer plate to increase the burning rate of the propellant. The end outer plate is shaped such that the burning area at the turning portion remains substantially constant, so that variations in the burning area at the turning portion are minimized, making it possible to generate a stable amount of a gas throughout burning time.

The burning rate increasing member for increasing the burning rate, which is provided around the outer periphery, makes it easily possible to attain the same burning area at the turning portion from the outer layer to the inner layer by means of the shape of the propellant.

Further, according to the preferred embodiment of the present invention, the propellant 14 is concentrically charged in a plurality of layers without a gap in the hollow cylindrical combustor 12, permitting a higher mass ratio of a gas generator propellant to be achieved.

The inner surface or the outer surface of the interstructure 16 is provided with the insulation 21 and the relief boot 25, and the combustor 12 is constructed so that one or both axial ends thereof are detachable, thus allowing the propellant to be charged therein directly and easily.

It is needless to say that the present invention is not limited to the embodiments described above and may be implemented in a variety of modifications within a range which does not deviate from the spirit of the present invention.

What is claimed is:
1. An end burning type gas generator comprising:
(a) a hollow cylindrical combustor;
(b) a first propellant densely charged in the combustor concentrically in a plurality of layers without leaving a large void in an internal cross section thereof, wherein the sectional area of each layer is equal, and wherein the plurality of layers include an outermost layer and an innermost layer; and
(c) an interstructure that separates the plurality of layers from each other and that connects an inner layer and an outer layer of the plurality of layers only at a turning portion on an axial end of the end burning type gas generator, wherein the turning portion comprises
  i. an end outer plate continuously surrounding ends of the inner layer and the outer layer; and
  ii. a burning rate increasing member provided along an inner surface of the end outer plate to increase the burning rate of the first propellant, and where the end outer plate is shaped so that a burning area at the turning portion remains substantially constant;
wherein the first propellant sequentially burns at an end from the outermost layer or the innermost layer via the turning portion.

2. The end burning type gas generator according to claim 1, further comprising:
(d) a modified insulation having a curved surface that alternately bulges toward, and then is recessed from, an inside of the combustor, or a curved surface combining bulging and recessed surfaces, wherein the modified insulation is disposed at the end of the inner layer of the turning portion,
wherein the modified insulation is shaped so that the burning area at the turning portion remains substantially constant.

3. The end burning type gas generator according to claim 1, further comprising:
(d) a slanting insulation whose sectional area gradually decreases as a burning length increases and that is disposed around an outer periphery of the outer layer at the turning portion,
wherein the slanting insulation is shaped so that the burning area immediately after a turn at the turning point remains substantially constant.

4. The end burning type gas generator according to claim 1, wherein the burning rate increasing member comprises a wire, foil, or mesh member made of a metal having high thermal conductivity and a high melting point.

5. The end burning type gas generator according to claim 4, wherein the inner surface of the end outer plate includes insulation having low thermal conductivity and high heat resistance, and
the burning rate increasing member is provided directly on, or slightly apart from, an inner surface of the insulation, wherein the first propellant is charged therein.

6. The end burning type gas generator according to claim 4, wherein the inner surface of the end outer plate includes insulation having low thermal conductivity and high heat resistance, and
a thin gas generating film made of a second propellant containing a burning rate increasing member is attached to an inner surface of the insulation, wherein the first propellant is charged therein.

7. The end burning type gas generator according to claim 1, wherein the burning rate increasing member is a high burning rate second propellant having a burning rate that is higher than that of the first propellant.

8. The end burning type gas generator according to claim 1, wherein the interstructure includes only a soft material with no hard core material and has a relief boot formed by doubling the interstructure.

9. The end burning type gas generator according to claim 1, wherein the combustor has one or more nozzles, wherein the one or more nozzles exhaust a gas generated by burning the first propellant, at one axial end or both axial ends thereof, and
the one or more nozzles are in communication with a burning surface of the first propellant.

10. The end burning type gas generator according to claim 1, wherein the combustor is constructed so that one or both axial ends are detachable so as to allow the first propellant to be directly charged therein.

11. The end burning type gas generator according to claim 1,
wherein an inner surface or an outer surface of the interstructure has an insulation exhibiting low thermal conductivity and high heat resistance, and
a relief boot that is heat resistant and flexible is provided on a surface of the insulation at a location other than the turning portion.

12. An end burning type gas generator comprising:
(a) a hollow cylindrical combustor;
(b) a first propellant densely charged in the combustor concentrically in a plurality of layers without leaving a large void in an internal cross section thereof, wherein the sectional area of each layer is equal, and wherein the plurality of layers include an inner layer, an intermediate layer, and an outer layer; and
(c) an interstructure that separates the plurality of layers from each other and that connects the inner layer and the outer layer of the plurality of layers only at a turning portion on an axial end of the end burning type gas generator, wherein the turning portion comprises
  i. an end outer plate continuously surrounding ends of the inner layer and the outer layer; and
  ii. a burning rate increasing member provided along an inner surface of the end outer plate to increase the burning rate of the first propellant, and where the end outer plate is shaped so that a burning area at the turning portion remains substantially constant;

wherein the first propellant sequentially burns at an end from the outer layer or the inner layer via the turning portion.

13. An end burning type gas generator comprising:
   (a) a hollow cylindrical combustor;
   (b) a first propellant densely charged in the combustor concentrically in a plurality of layers without leaving a large void in an internal cross section thereof, wherein the sectional area of each layer is equal, and wherein the plurality of layers include an outer layer disposed as an outermost layer and an inner layer disposed as an innermost layer; and
   (c) an interstructure that separates the plurality of layers from each other and that connects the inner layer and the outer layer of the plurality of layers only at a turning portion on an axial end of the end burning type gas generator, wherein the turning portion comprises
      i. an end outer plate continuously surrounding ends of the inner layer and the outer layer; and
      ii. a burning rate increasing member provided along an inner surface of the end outer plate to increase the burning rate of the first propellant, and where the end outer plate is shaped so that a burning area at the turning portion remains substantially constant;
wherein the first propellant sequentially burns at an end from the outermost layer or the innermost layer via the turning portion.

* * * * *